(12) United States Patent
Yamamoto et al.

(10) Patent No.: US 9,217,865 B2
(45) Date of Patent: Dec. 22, 2015

(54) LIGHT PROJECTION DEVICE

(75) Inventors: Atsuyuki Yamamoto, Kanagawa (JP); Ryo Kawamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 163 days.

(21) Appl. No.: 14/113,695

(22) PCT Filed: Apr. 20, 2012

(86) PCT No.: PCT/JP2012/060696
§ 371 (c)(1),
(2), (4) Date: Oct. 24, 2013

(87) PCT Pub. No.: WO2012/160913
PCT Pub. Date: Nov. 29, 2012

(65) Prior Publication Data
US 2014/0043545 A1    Feb. 13, 2014

(30) Foreign Application Priority Data
May 23, 2011 (JP) .................................. 2011-114709

(51) Int. Cl.
*G03B 21/14*    (2006.01)
*G02B 27/00*    (2006.01)
(Continued)

(52) U.S. Cl.
CPC ............ *G02B 27/0025* (2013.01); *F21V 33/00* (2013.01); *G01J 1/4228* (2013.01);
(Continued)

(58) Field of Classification Search
CPC . G02B 27/0025; G02B 27/1046; G03B 21/14
USPC ........ 353/28, 30, 69; 348/586, 590, 743–747, 348/E5.139, E9.027
See application file for complete search history.

(56) References Cited

U.S. PATENT DOCUMENTS

2002/0113950 A1*   8/2002   Vlahos ............................ 353/97
2005/0117132 A1*   6/2005   Agostinelli ................... 353/122
(Continued)

FOREIGN PATENT DOCUMENTS

JP    2008-135345 A    6/2008
JP    2009-117351 A    5/2009
(Continued)

OTHER PUBLICATIONS

International Search Report for corresponding International Application No. PCT/JP2012/060696 mailed Jul. 17, 2012.
(Continued)

*Primary Examiner* — Sultan Chowdhury
(74) *Attorney, Agent, or Firm* — Renner, Otto, Boisselle & Sklar, LLP

(57) ABSTRACT

A light projection device capable of irradiating light only onto an object includes: a light projector in which an object and a back surface of the object are taken as a projectable range; a shadow region detector that detects a shadow that occurs on the back surface of the object by projection light; and a controller that corrects a shadow region so that a projection region of the light projector and the shadow region can coincide with each other on the back surface of the object, sets the corrected shadow region as a light projection range and sets, as a non-light projection range, a region other than the shadow region, and sets projection light projected onto the set light projection range, wherein the light projector projects the projection light onto a range where the object is present by projecting the set projection light onto the set light projection range.

10 Claims, 7 Drawing Sheets

(51) Int. Cl.
F21V 33/00 (2006.01)
G01J 1/42 (2006.01)
H04N 9/31 (2006.01)
F21S 2/00 (2006.01)
F21V 23/04 (2006.01)
F21W 131/405 (2006.01)
G01J 1/26 (2006.01)
G03B 15/07 (2006.01)

(52) U.S. Cl.
CPC ........... *H04N9/3182* (2013.01); *H04N 9/3194* (2013.01); *F21S 2/00* (2013.01); *F21V 23/0464* (2013.01); *F21W 2131/405* (2013.01); *G01J 1/26* (2013.01); *G03B 15/07* (2013.01)

(56) References Cited

U.S. PATENT DOCUMENTS

| | | | | |
|---|---|---|---|---|
| 2006/0244921 | A1* | 11/2006 | Childers | 353/30 |
| 2007/0273842 | A1* | 11/2007 | Morrison et al. | 353/97 |
| 2008/0100806 | A1 | 5/2008 | Inazumi | |
| 2008/0151128 | A1* | 6/2008 | Su et al. | 348/744 |
| 2008/0174678 | A1* | 7/2008 | Solomon | G02B 27/0025 348/231.99 |
| 2010/0177929 | A1 | 7/2010 | Kurtz et al. | |
| 2012/0057053 | A1* | 3/2012 | Mallon | G01M 11/0264 348/241 |

FOREIGN PATENT DOCUMENTS

| | | |
|---|---|---|
| JP | 2009-225432 A | 10/2009 |
| JP | 2010-015996 A | 1/2010 |
| WO | WO 2007/134456 A1 | 11/2007 |

OTHER PUBLICATIONS

Form PCT/ISA/237 for corresponding International Application No. PCT/JP2012/060696 dated Jul. 17, 2012.
European Search Report for corresponding European Application No. 12788927.7 dated Jul. 20, 2015.
Summet et al., "Shadow Elimination and Blinding Light Suppression for Interactive Projected Displays", IEEE Transactions on Visualization and Computer Graphics, vol. 13, No. 3, May/Jun. 2007, pp. 508-517.

* cited by examiner

LIGHT PROJECTION DEVICE

TECHNICAL FIELD

The present invention relates to a light projection device that projects light onto an object.

BACKGROUND ART

For example, in a display window and the like, there is a case where illumination light is desired to be irradiated onto a mannequin equipped with a commercial article. In conventional technologies, there have been performed: light irradiation onto the mannequin by a spotlight and the like; control for a shape of irradiation light, which is performed so that only the mannequin can be illuminated in such a manner that a shape of the mannequin and a positional relationship thereof with a lighting fixture are measured; and the like.

Moreover, heretofore, as in Patent Literatures 1 and 2, a light projection device and a lighting device have been known, which are capable of projecting light with a shape, which is desired by a user, by controlling a shape of projection light.

CITATION LIST

Patent Literature

[PTL 1] Japanese Patent Laid-Open Publication No. 2009-225432
[PTL 2] Japanese Patent Laid-Open Publication No. 2009-117351

SUMMARY OF INVENTION

However, among the above-described conventional technologies, the spotlight irradiates circular light. Therefore, only an object cannot be irradiated, and leak light occurs on a background portion of the object. Accordingly, only a part of the object has been irradiated. Meanwhile, with regard to the case where movement and deformation of the object occur, it is possible to allow the light to follow movement and deformation, which are determined in advance; however, it is necessary to change a position and orientation of the lighting device itself.

Moreover, also in such a technology for irradiating only the object by measuring the shape of the object and the positional relationship thereof with the lighting device, it is possible to allow the light to follow the movement and the deformation, which are determined in advance; however, in the case of freely moving and deforming the object, the light cannot be allowed to follow the same.

In this connection, the present invention has been proposed in consideration of the above-mentioned circumstances. It is an object of the present invention to provide a light projection device capable of irradiating light only onto the object.

A light projection device according to a first aspect achieving the above-described object is a light projection device that projects light onto an object arranged in an arbitrary space, including: a light projector that projects projection light, in which the object and a back surface of the object are taken as a projectable range; a shadow region detector that detects a shadow region occurring on the back surface of the object by the projection light projected from the light projector; a shadow region corrector that corrects the shadow region, which is detected by the shadow region detector, so that a projection region of the light projector and the shadow region detected by the shadow region detector can coincide with each other on the back surface of the object; a projection range setting unit that sets, as a light projection range, the shadow region corrected by the shadow region corrector, and sets, as a non-light projection range, a region other than the shadow region; and a projection light setting unit that sets projection light projected onto the light projection range set by the projection range setting unit, characterized in that the light projector projects the projection light, which is set by the projection light setting unit, onto a range where the object is present by projecting the projection light onto the light projection range set by the projection range setting unit.

A light projection device according to a second aspect is the light projection device according to the first aspect, characterized in that the projection light setting unit specifies an element including any of illuminance, brightness, luminous intensity, luminous flux, color temperature and color rendering properties of the projection light projected by the light projector.

A light projection device according to a third aspect is the light projection device according to either one of the first and second aspects, characterized in that the shadow region corrected by the shadow region corrector is taken as a first projection range, and a region other than the shadow region, is taken as a second projection range, the projection light setting unit individually sets light projected onto the first projection range and the second projection range, and the projectable region of the light projector is divided into the first projection range where the object is present and the second projection range where the object is not present, and the light projector projects different pieces of light onto the first projection range and the second projection range.

A light projection device according to a fourth aspect is the light projection device according to any one of the first to third aspects, characterized in that a shadow detection operation by the shadow region detector, a shadow region correction operation by the shadow region corrector, and a projection range setting operation by the projection range setting unit are performed at an arbitrary time interval.

A light projection device according to a fifth aspect is the light projection device according to any one of the first to fourth aspects, characterized in that the shadow region detector includes a black light projector that projects black light onto a region including the projectable range of the light projector, and detects a shadow region formed of the black light projected by the black light projector.

A light projection device according to a sixth aspect is the light projection device according to any one of the first to fifth aspects, characterized in that the light projector is configured to project the projection light from two or more positions, and the projection range setting unit sets the projection range for each of light projection positions.

A light projection device according to a seventh aspect is the light projection device according to any one of the first to fifth aspects, characterized in that the shadow region detector is configured to detect the shadow regions from two or more positions, the shadow region corrector calculates the shadow region corrected for each of shadow region detection positions, and the projection range setting unit integrates the respective shadow regions corrected by the shadow region corrector, and sets the projection range of the light projector.

A light projection device according to an eighth aspect is the light projection device according to any one of the first to seventh aspects, characterized in that the shadow region detector is composed of a light sensor embedded in the back surface of the object.

A light projection device according to a ninth aspect is the light projection device according to any one of the first to eighth aspects, characterized in that it is possible to adjust timing of generation of illumination data for projecting the projection light as illumination light by the light projector, the generation being performed by an illumination data generator that generates the illumination data, and irradiation timing of the illumination light by the light projector.

A light projection device according to a tenth aspect is the light projection device according to any one of the first to ninth aspects, characterized in that the light projector projects a video, and the projection light setting unit sets a video as the light projected from the light projector.

In accordance with each of the light projection devices described above, the shadow region of the object is detected, and the shadow region is corrected so that the projection region of the light projector and the shadow region can coincide with each other on the back surface, and the shadow region thus corrected is set as the light projection range, and accordingly, the projection light can be projected onto the range where the object is present. Hence, in accordance with the light projection device described above, the projection light can be irradiated only onto the object.

DESCRIPTION OF EMBODIMENTS

A description is made below of embodiments of the present invention with reference to the drawings.

First Embodiment

Figure 1:
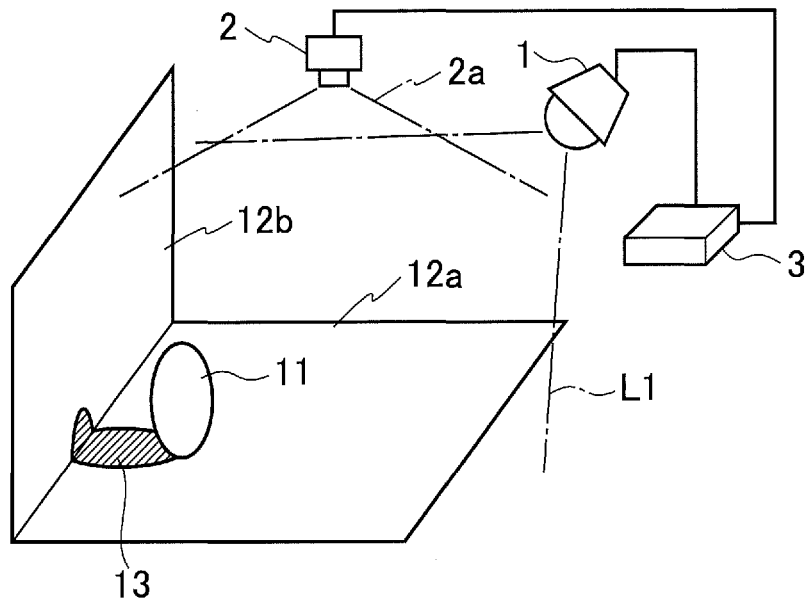
FIG. 1 is a perspective view showing a configuration of a light projection device shown as a first embodiment of the present invention.

A light projection device shown as an embodiment of the present is configured, for example, as shown in FIG. 1. This light projection device is one that projects projection light L1 onto an irradiation target object 11 arranged in an arbitrary space.

As the irradiation target object 11, for example, a commercial article, a mannequin or the like in a showroom is assumed. Moreover, the irradiation target object 11 may be a deformable or movable one. The irradiation target object 11 is placed on a floor surface 12a as a background region. Moreover, a back surface 12b is provided behind the irradiation target object 11.

The light projection device includes a light projector 1, a shadow region detector 2, and a controller 3.

In the light projector 1, the irradiation target object 11 and the floor surface 12a and the back surface 12b, which serve as back surface regions of the irradiation target object 11, are taken as a projectable range. The light projector 1 projects the projection light L1 onto the irradiation target object 11 in accordance with control of the controller 3. The light projector 1 is realizable, for example, by a projector that projects illumination light and video light, and the like.

The shadow region detector 2 detects a shadow region 13 of the irradiation target object 11, which is generated on the floor surface 12a and the back surface 12b by the projection light L1 projected from the light projector 1. This shadow region 13 is determined by a positional relationship between the light projector 1 and the irradiation target object 11, and by a shape of the irradiation target object 11. In this embodiment, there is shown a situation where the shadow region 13 is generated on the floor surface 12a and the back surface 12b by the projection light L1 coming from the light projector 1. This shadow region detector 2 takes, as an imaging range 2a, the floor surface 12a and the back surface 12b, which include the shadow region 13 of the irradiation target object 11, and is realizable by a camera that acquires image data, and the like.

The controller 3 controls operations of the light projector 1 and the shadow region detector 2. This controller 3 is composed, for example, a computer or the like, in which a CPU executes a program for controlling the light projector 1 and the shadow region detector 2, whereby control signals and the like are outputted to the light projector 1 and the shadow region detector 2.

Figure 2:
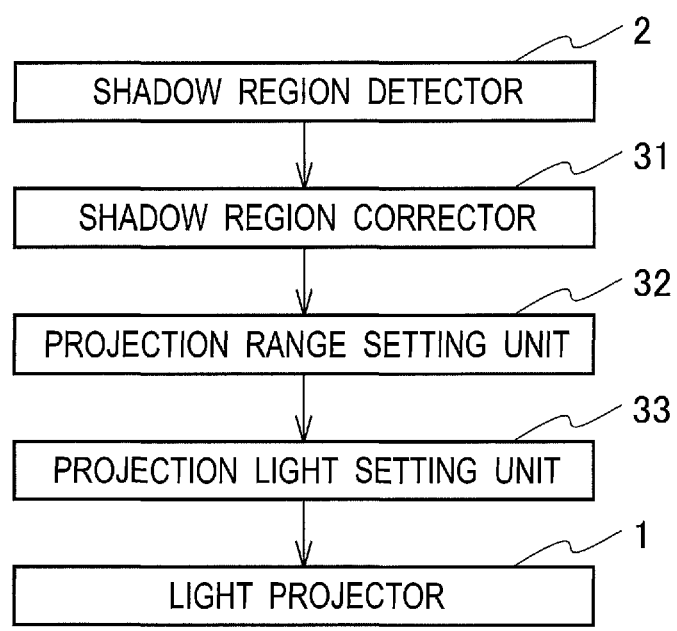
FIG. 2 is a block diagram showing the configuration of the light projection device shown as the first embodiment of the present invention.

As shown in FIG. 2, the controller 3 includes a shadow region corrector 31, a projection range setting unit 32 and a projection light setting unit 33 as functional constituents thereof.

The shadow region corrector 31 acquires the shadow region 13 detected by the shadow region detector 2. The shadow region 13 is detected, for example, by the image data by the shadow region detector 2. Among the image data, the shadow region corrector 31 recognizes dark pixels, which are equivalent to a shadow of the irradiation target object 11, as the shadow region 13.

The shadow region corrector 31 corrects the shadow region 13, which is detected by the shadow region detector 2, so that a projection range of the light projector 1 and the shadow region 13 detected by the shadow region detector 2 can coincide with each other on the floor surface 12a and the back surface 12b. At this time, the shadow region corrector 31 acquires the shadow region 13 detected by the shadow region detector 2 at the time when the projection light L1 is irradiated by the light projector 1 onto a wide range including the irradiation target object 11. Then, based on a position and shape of the acquired shadow region 13, the shadow region corrector 31 specifies the projection light L1 that is projected onto the position of the shadow region 13.

As a detection method of the shadow region 13 by the shadow region detector 2, the floor surface 12a and the back surface 12b are imaged by using the camera as the shadow region detector 2, and the shadow region 13 is extracted based on a brightness change and color change of an imaged image. Then, as a specifying method of the projection light L1 by the light projector 1, which corresponds to the shadow region 13, the shadow region corrector 31 performs projection conversion so that an optical axis of the light projector 1 and an optical axis of the shadow region detector 2 with respect to the specific floor surface 12a and back surface 12b can be matched with each other. In such a way, the shadow region corrector 31 allows coincidence between projection spots of the light projector 1 and detection spots of the shadow region 13 on the floor surface 12a and the back surface 12b. That is to say, the shadow region corrector 31 performs image processing for correcting a projected image of the light projector 1 and the imaged image of the shadow region detector 2 so that the projected image and the imaged image can coincide with each other on the same plane.

Figure 3:
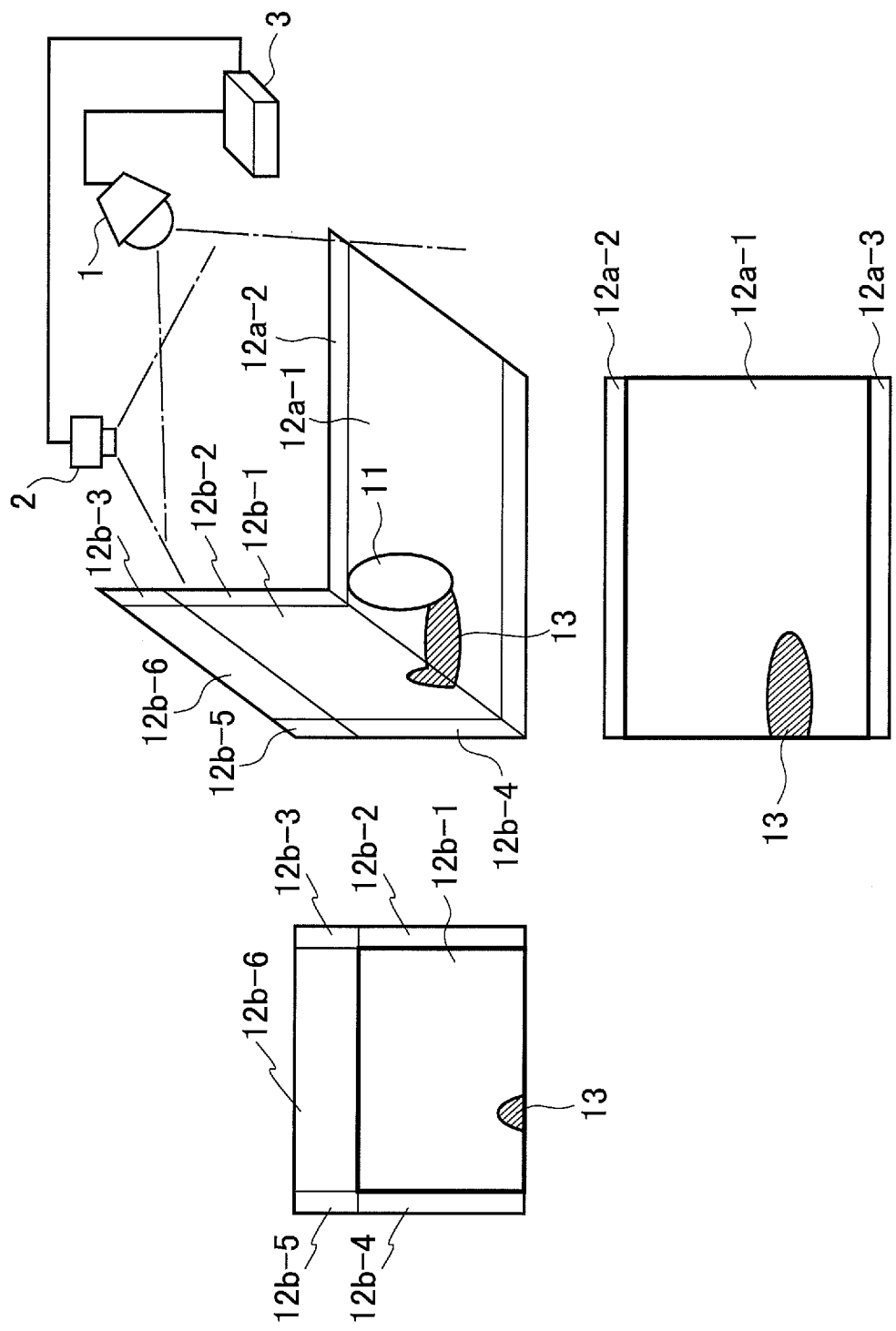
FIG. 3 is a view showing a perspective view in the light projection device shown as the first embodiment of the present invention, and showing a top view and front view of a shadow region.

A specific description of the above is made while showing a perspective view in FIG. 3(a), a top view in FIG. 3(b) and a front view in FIG. 3(c). The projection range onto which the projection light L1 is projectable by the light projector 1 is 12a-1, 12b-1 and 12b-6. Meanwhile, a detectable range of the shadow region 13 by the shadow region detector 2 is 12a-2, 12a-3, 12b-2 and 12b-4 in addition to 12a-1 and 12b-1. Hence, 12a-1 and 12b-1 in thick-bordered boxes shown in FIGS. 3(b) and 3(c) make a range where the projection range onto which the projection light L1 is projectable by the light projector 1 and the detectable range of the shadow region 13 by the shadow region detector 2 overlap each other. In such an overlap range, a correspondence relationship between the projection light L1 and the shadow region 13 is clear. That is to say, if the pixels of the shadow region 13 are known, then it is known which part of the projection light L1 makes the shadow region 13. Hence, this overlap range is a smaller one between such a range which the projection light L reaches and the detectable range of the shadow region 13, and this smaller one becomes a part of a larger one.

The shadow region corrector 31 calculates in advance a correspondence relationship between each pixel of the image acquired by the shadow region detector 2 and the projection light L1 of the light projector, and creates and prestores a correspondence map. In the case of having acquired an image obtained by actually imaging the shadow region 13 by the shadow region detector 2, the shadow region corrector 31 refers to the correspondence map concerned, and performs light specification for the projection light L1 corresponding to the shadow region 13.

The projection range setting unit 32 sets a correction region of the shadow, which is corrected by the shadow region corrector 31, as a light projection range, and sets a region, which is other than the light projection range, as a non-light projection range.

Moreover, the projection range setting unit 32 may set a region, which corresponds to the shadow region 13, as a first projection range, and may set a region, which is other than the first projection range, as a second projection range. The projection range setting unit 32 can set the projection range L1 individually for each of the first projection range and the second projection range. In such a way, different pieces of the projection light L1 can be projected onto such a region where the irradiation target object 11 is present, and onto a region other than the region concerned.

The projection light setting unit 33 sets light, which is projected onto the light projection range set by the projection range setting unit 32. Specifically, the projection light setting unit 33 sets light, which is projected onto the projection range set by the projection range setting unit 32, or onto the first projection range and the second projection range. For example, the projection light setting unit 33 sets illumination light and video light, which are projected individually for each of the above. Moreover, besides such a function to set the projection range, the projection light setting unit 33 may have a function capable of specifying elements including illuminance, brightness, luminous intensity, luminous flux, color temperature and color rendering properties of the projection light L1. In such a way, the light projection device can set the projection light L1 by parameters for use in lighting.

Moreover, the projection range setting unit 32 may set black light on the first projection range. In such a way, it is also made possible not to project the light onto the irradiation target object 11.

Figure 4:
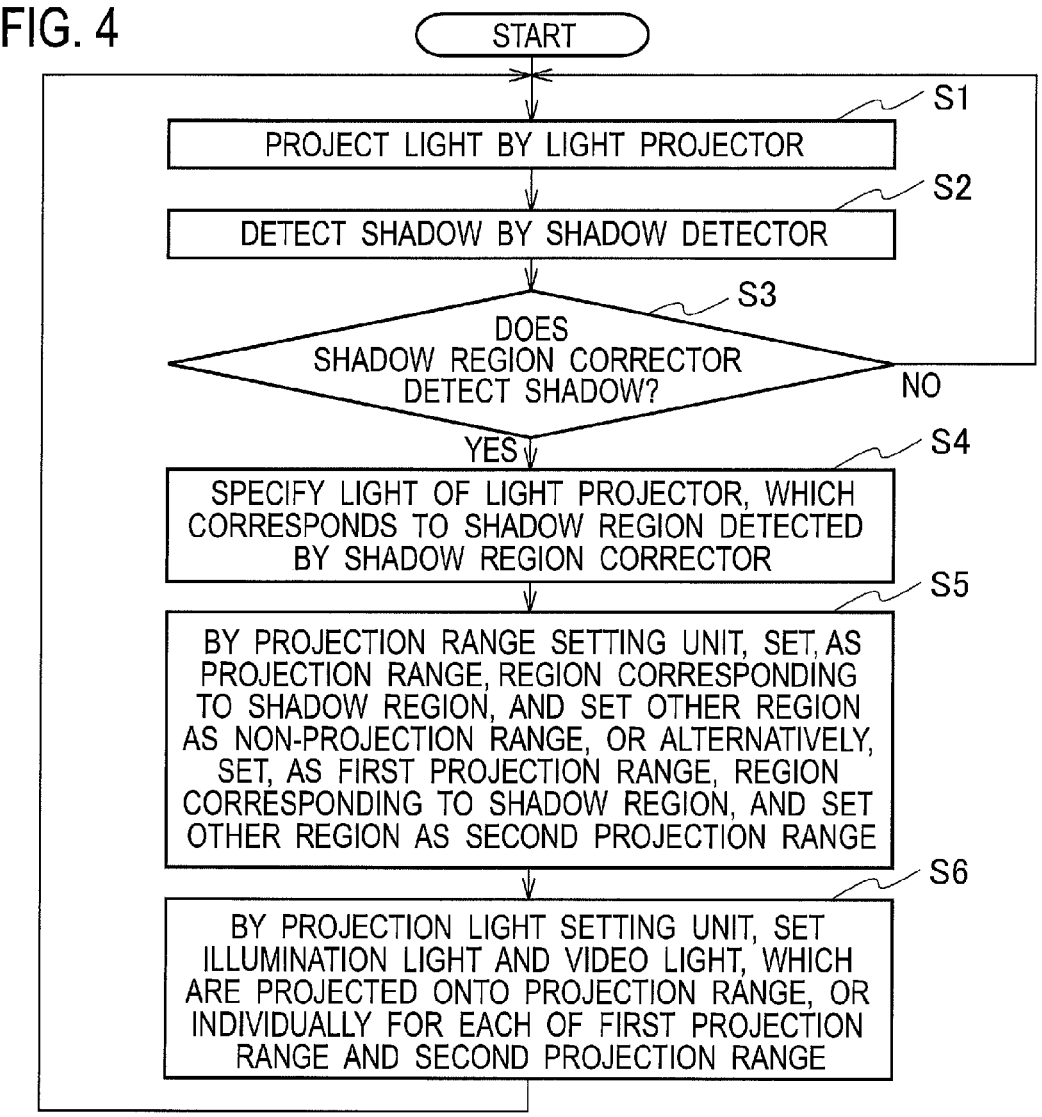
FIG. 4 is a flowchart showing an operation procedure of the light projection device shown as the first embodiment of the present invention.

The light projection device as described above operates, for example, as shown in FIG. 4.

First, in Step S1, the light projection device projects the projection light L1 onto the whole of the projectable range, which includes the irradiation target object 11, the floor surface 12a and the back surface 12b, by the light projector 1.

In Step S2 that comes next, the shadow region detector 2 detects the shadow region 13, which is generated on the floor surface 12a and the back surface 12b, in a state where the projection light L1 is projected by the light projector 1.

In Step S3 that comes next, the shadow region corrector 31 refers to the image data detected by the shadow region detector 2, and determines whether or not an image region equivalent to the shadow region 13 is present. In such a way, the shadow region corrector 31 determines whether or not the shadow region 13 is detected. In the case where the shadow region 13 is detected, the processing is advanced to Step S4, and in the case where the shadow region 13 is not detected, the processing is returned to Step S1. In the case where the processing is returned to Step S1, Step S1 to Step S3 are repeated until the shadow is extracted by the shadow region corrector 31 as a result of projecting the projection light L1 from the light projector 1.

In Step S4, the shadow region corrector 31 specifies the projection light L1 of the light projector 1, which corresponds to the detected shadow region 13. At this time, as mentioned above, the shadow region corrector 31 performs the projection conversion so that the optical axis of the light projector 1 and the optical axis of the shadow region detector 2 on the floor surface 12a and the back surface 12b can be matched with each other, and allows the coincidence between the projection spots on the floor surface 12a and the back surface 12b and the detection spots of the shadow region 13. Specifically, the shadow region corrector 31 performs such a projection conversion operation as described above, or performs the projection conversion by using the correspondence map prepared in advance, and thereby specifies the projection light L1 with respect to the shadow region 13.

In Step S5, in the case of irradiating the projection light L1 only onto the irradiation target object 11, the projection range setting unit 32 sets such a correction region of the shadow region 13, which is corrected by the shadow region corrector 31, as the light projection range, and sets the region, which is other than the light projection range, as the non-light projection range. Alternatively, in the case of projecting the different pieces of projection light L1 onto the irradiation target object 11 and the floor surface 12a and the back surface 12b, the projection range setting unit 32 sets the region, which corresponds to the shadow region 13, as the first projection range, and sets the region, which is other than the first projection range, as the second projection range.

In Step S6, the projection light setting unit 33 sets the projection light L1, which is projected onto the light projection range set by the projection range setting unit 32. For example, the projection light setting unit 33 makes setting that the illumination light is to be projected. Alternatively, in the case where the first projection range and the second projection range are set, the projection light setting unit 33 sets the illumination light and the video light, which are projected individually for each thereof.

For example, in the case where the projection light L1 is the illumination light, the projection light setting unit 33 sets the element including any of the illuminance, the brightness, the luminous intensity, the luminous flux, the color temperature and the color rendering properties. Moreover, the projection light setting unit 33 sets the black light on the first projection range, and sets the illumination light and the video on the second projection range, thus making it possible not to project the light onto the irradiation target object 11. Moreover, in the case where the projection light L1 is the video light, the projection light setting unit 33 sets the video, which is projected as the projection light L1.

As described above, in accordance with the light projection device shown as the first embodiment, the shadow region 13 of the irradiation target object 11 is detected, and is corrected so as to coincide with the projection region of the light projector 1 on the floor surface 12a and the back surface 12b, and the shadow region 13 thus corrected is set as the light projection range. In such a way, the light projector 1 projects the projection light L1 onto the set light projection range, and can thereby project the projection light L1 onto the range where the irradiation target object 11 is present. Hence, in accordance with this light projection device, the projection light L1 can be irradiated only onto the irradiation target object 11.

Moreover, it is not necessary for this projection device to measure the shape of the irradiation target object 11, and so on in advance, and this projection device can irradiate the projection light L1, which is neither too much nor too little, onto the irradiation target object 11.

Furthermore, in accordance with this light projection device, the element including any of the illuminance, brightness, luminous intensity, luminous flux, color temperature and color rendering properties of the projection light L1 can be specified, and accordingly, the projection light L1 projected onto the irradiation target object 11 can be adjusted.

Furthermore, in accordance with this light projection device, the shadow region 13 as the range where the irradiation target object 11 is irradiated is set as the first projection range, and the region other than the first projection range, which is such as the floor surface 12a and the back surface 12b, is set as the second projection range. In such a way, in accordance with this light projection device, the projection light L1 projected onto the first projection range and the second projection range can be set individually, and the different pieces of projection light L1 can be projected individually thereonto.

In the light projection device as described above, in the case of projecting the projection light L1 from the light projector 1, the light projector 1 may project the projection light L1 as the illumination light. In this case, desirably, by the control of the controller 3, the light projection device is capable of adjusting timing of generation of illumination data for projecting the projection light L1 as the illumination light by the light projector 1, the generation being performed by an illumination data generator that generates the illumination data. Moreover, desirably, the controller 3 is capable of adjusting irradiation timing of the illumination light by the light projector 1.

Here, only irradiation timing of the illumination light as the projection light L1 is controlled freely, whereby the same visible effect appears between the case where the generation of the illumination data is always performed and the case where such generation timing is controlled in response to the irradiation timing of the illumination light. For this, the generation timing of the illumination data is controlled, whereby such generation processing of the illumination data can also be stopped, and a processing load of the controller 3 can be reduced. In such a way, the controller 3 can apply the processing load to shadow region correction processing, projection range setting processing and projection light setting processing. Moreover, the generation processing of the illumination data by the controller 3 is stopped, whereby electrical power consumption of the controller 3 can be suppressed.

Second Embodiment

Next, a description is made of a light projection device according to a second embodiment. Note that the same reference numerals are assigned to similar portions to those of the above-mentioned first embodiment, whereby a detailed description thereof is omitted.

The light projection device as the second embodiment is one capable of projecting the projection light L1 onto the irradiation target object 11 even in the case where the irradiation target object 11 is deformed or moved.

At an arbitrary time interval, this light projection device performs a shadow detection operation by the shadow region detector 2, a shadow region correction operation by the shadow region corrector 31, and a projection range setting operation by the projection range setting unit 32. In such a way, even if the position and shape of the irradiation target object 11 are changed, the projection range of the projection light L1 can be automatically updated, and such an operation of projecting the different pieces of projection light L1 onto the irradiation target object 11 and onto the floor surface 12a and the back surface 12b, which are other than the irradiation target object 11, can be maintained.

Specifically, when the irradiation target object 11 is deformed or moved, in the case where the deformation or movement of the shadow region 13 is detected by the shadow region detector 2, and the shadow region corrector 31 recognizes the deformation concerned or the movement concerned, then the projection light L1 is irradiated onto the projectable range of the light projector 1 one more time by the light projector 1 concerned. In such a way, the shadow region detector 2 can detect the shadow region 13, which is as a result that the irradiation target object 11 is deformed or moved, and the projection light L1 can be projected onto the irradiation target object 11 so as to correspond to the shadow region 13 concerned.

Here, with regard to the irradiation of the projection light L1 by the light projector 1, the irradiation serving for detecting the deformation or movement of the shadow region 13, desirably, the whole of the projectable range is irradiated only for an extremely short time at a fixed interval. This operation can be easily packed in the light projection device mentioned above, and moreover, is effective for detecting the shadow region 13 surely and accurately. However, there is a possibility that a brightness flicker may occur.

In consideration of such a problem of the brightness flicker, desirably, only the deformation or movement of the shadow region 13 is detected. In this case, the shadow region corrector 31 detects a difference between shapes of the shadow region 13, which are changed in a time series, and detects the deformation or movement of the shadow region 13. This light projection device detects only the deformation or movement of the shadow region 13 by the shadow region detector 2, corrects the shadow region 13 by the shadow region corrector 31, and sets the projection range of the projection light L1 by the projection range setting unit 32. Also in such a way, the shadow region detector 2 can detect the shadow region 13, which is as a result that the irradiation target object 11 is deformed or moved, and the projection light L1 can be projected onto the irradiation target object 11 so as to correspond to the shadow region 13 concerned.

In accordance with this light projection device, even if the light projector 1 is moved or deformed, the projection range of the light projector 1 can be automatically updated, and such an effect of performing different pieces of the projection for the irradiation target object 11 and the regions other than the irradiation target object 11 concerned can be maintained.

Figure 5:
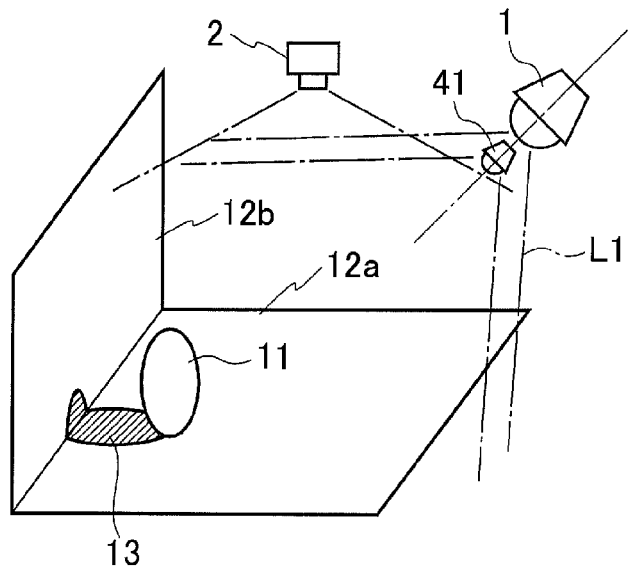
FIG. 5 is a perspective view showing a configuration of a light projection device shown as a second embodiment of the present invention.

Moreover, as another configuration example where the projection light L1 can be projected onto the irradiation target object 11 even in the case where the irradiation target object 11 is deformed or moved, a black light projector 41 may be used as shown in FIG. 5. The black light projector 41 projects black light invisible for a person who sees the irradiation target object 11 and the like. The black light projector 41 is arranged so as to obtain the same projection range as that of a visible light projector 1' equivalent to the light projector 1. For example, the black light projector 41 is arranged so that a projection axis thereof can be the same as a projection axis of the visible light projector 1'. For example, an ultraviolet light source is usable as the black light projector 41. In this case, it is necessary for the shadow region detector 2 to use an infrared camera.

In the light projection device as described above, as shown in FIG. 6, the black light projector 41 is connected to the shadow region corrector 31. At the time when the light projection device detects the shadow region 13, the black light projector 41 is driven by the shadow region corrector 31. In such a way, in the light projection device, the black light is projected by the black light projector 41, and the shadow region detector 2 is made capable of detecting the shadow region 13, which is generated by the black light concerned. In such a way, by the fact that the shadow region 13 is detected, the shadow region corrector 31 can recognize the shadow region in the image data.

Figure 6:
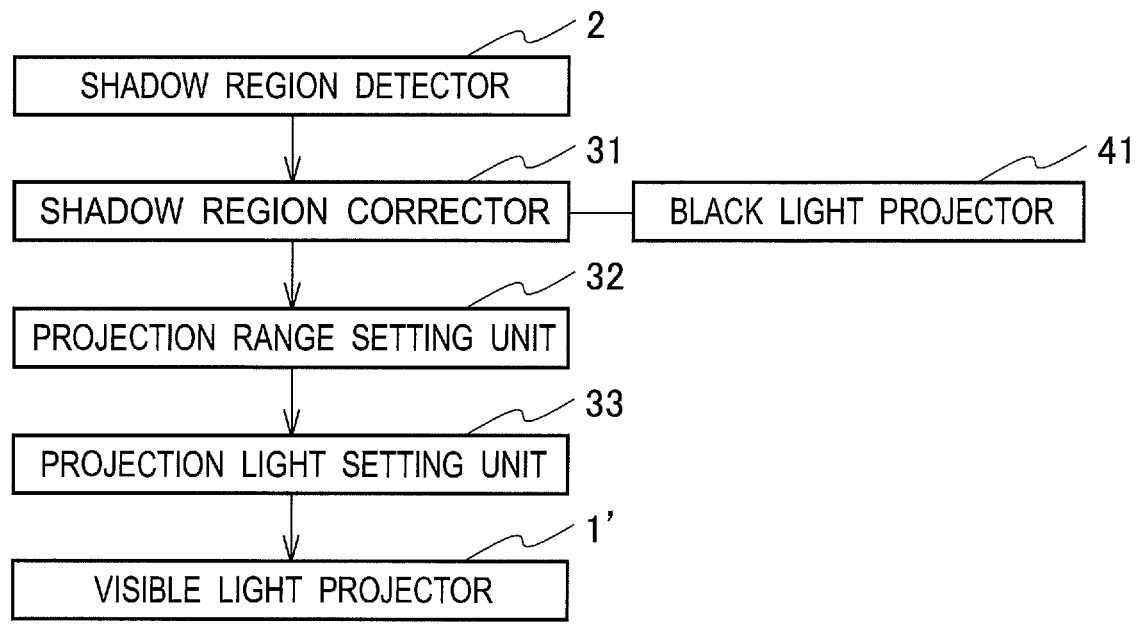
FIG. 6 is a block diagram showing the configuration of the light projection device shown as the second embodiment of the present invention.
Figure 7:
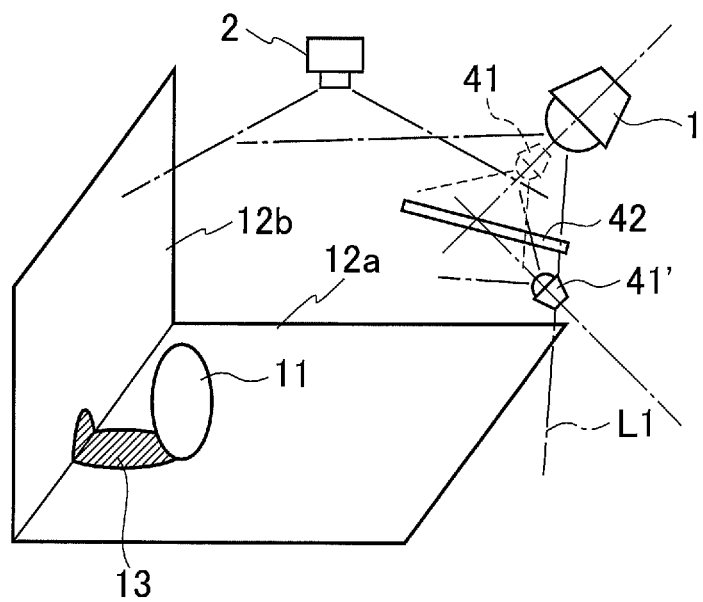
FIG. 7 is a perspective view showing another configuration of the light projection device shown as the second embodiment of the present invention.

Moreover, as another configuration example of providing the black light projector, as shown in FIG. 7, a position of the black light projector 41 of FIG. 6 may be defined as 41', and a black light reflector 42 that reflects black light projected from such a black light projector 41' may be provided. As the black light reflector 42, for example, a mirror can be used, which transmits the projection light L1 (visible light) coming from the light projector 1, and reflects the black light coming from the black light projector 41'.

This light projection device does not allow the black light projector 41' to block the visible light projected from the visible light projector 1'. Hence, the visible light can be projected onto the whole of the projectable range by the visible light projector 1', and the black light can be projected onto the projectable range of the visible light projector 1' by the black light projector 41' via the black light reflector 42.

As described above, in accordance with this light projection device, even in the case where the irradiation target object 11 is deformed or moved, such a change of the shadow region 13 by the deformation concerned or the movement concerned can be detected, and the projection range of the projection light L1 can be updated. Hence, in accordance with this light projection device, the deformation or movement of the irradiation target object 11 can be followed.

Third Embodiment

Next, a description is made of a light projection device according to a third embodiment. Note that the same reference numerals are assigned to similar portions to those of the above-mentioned embodiments, whereby a detailed description thereof is omitted.

Figure 8:
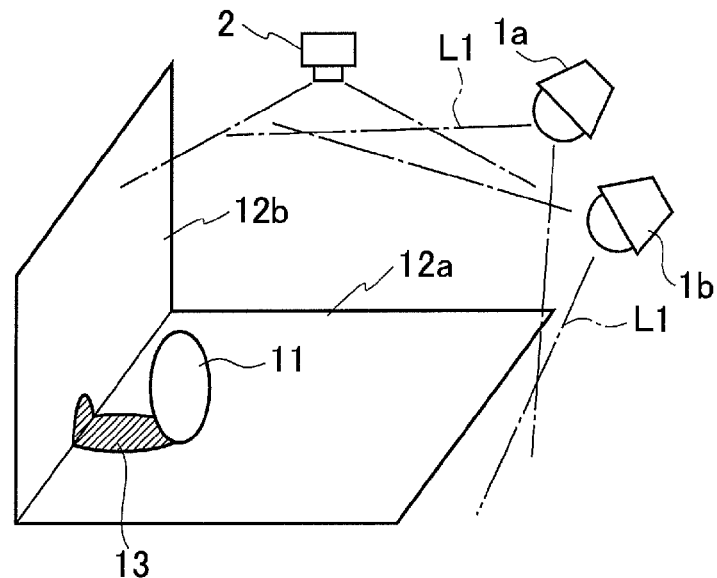
FIG. 8 is a perspective view showing a configuration of a light projection device shown as a third embodiment of the present invention.
Figure 9:
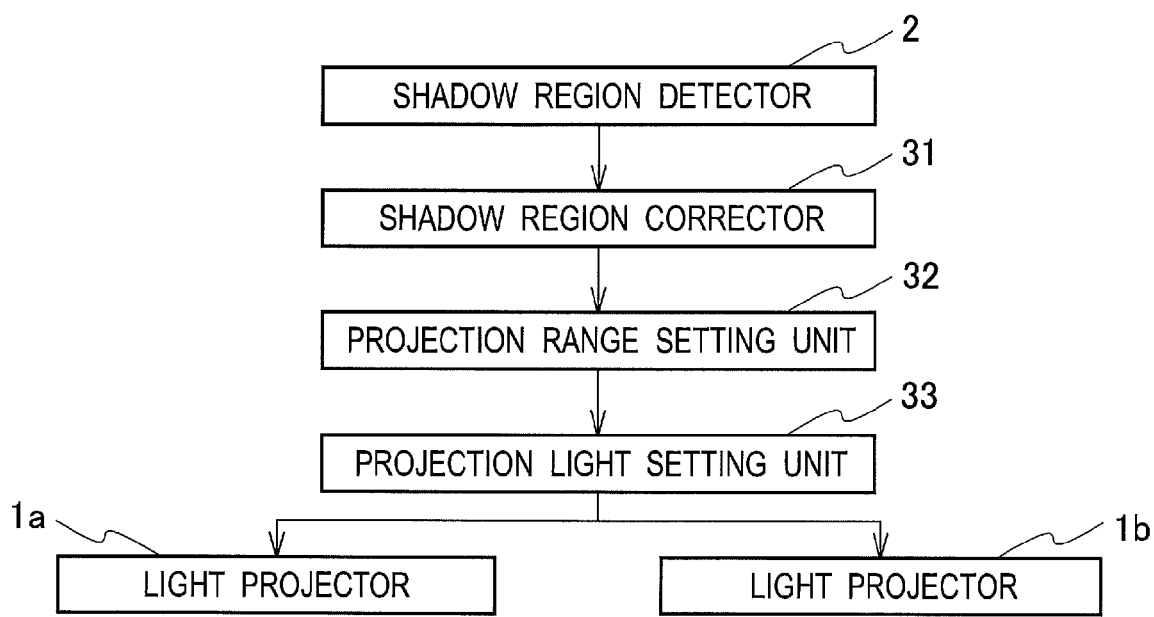
FIG. 9 is a block diagram showing the configuration of the light projection device shown as the third embodiment of the present invention.

As shown in FIG. 8 and FIG. 9, the light projection device as the third embodiment includes two or more light projectors 1a and 1b. In such a way, the light projection device is configured so as to project the projection light from two or more positions. Moreover, in the light projection device, the projection range setting unit 32 sets a plurality of the projection ranges corresponding to the respective light projectors 1a and 1b. Note that, in this embodiment, the light projectors are two light projectors 1a and 1b; however, the number of light projectors may be more than two.

This light projection device can widen the whole of the projection range, for example, by the projection ranges of the light projectors 1a and 1b. In such a way, even in the case where such a light projector 1 with a narrow projection range is used, and even in the case where the projection range to be required is wide, the projection light L1 can be projected onto a range onto which only one light projector 1 cannot project the projection light L1.

This light projection device arranges the light projectors 1a and 1b, for example, so that different pieces of the projection light L1 can be projected onto the irradiation target object 11 from different angles. In such a way, from many directions, the light projection device can project the projection light L1 onto the irradiation target object 11 and the floor surface 12a and the back surface 12b by the light projectors 1a and 1b.

Moreover, the light projection device may arrange the light projectors 1a and 1b so that the projection ranges of the light projectors 1a and 1b can overlap each other. In such a way, there can be enhanced brightness of the projection light L1 in such a range where the pieces of projection light L1 projected by the light projectors 1a and 1b overlap each other.

Fourth Embodiment

Next, a description is made of a light projection device according to a fourth embodiment. Note that the same reference numerals are assigned to similar portions to those of the above-mentioned embodiments, whereby a detailed description thereof is omitted.

Figure 10:
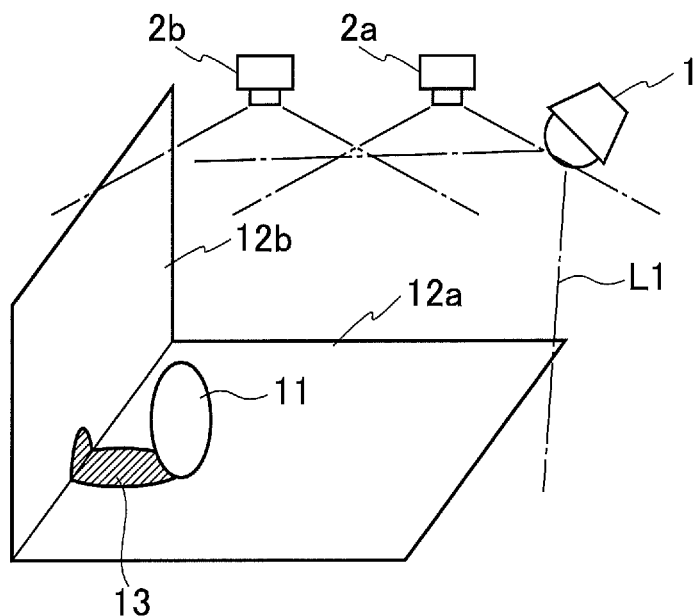
FIG. 10 is a perspective view showing a configuration of a light projection device shown as a fourth embodiment of the present invention.
Figure 11:
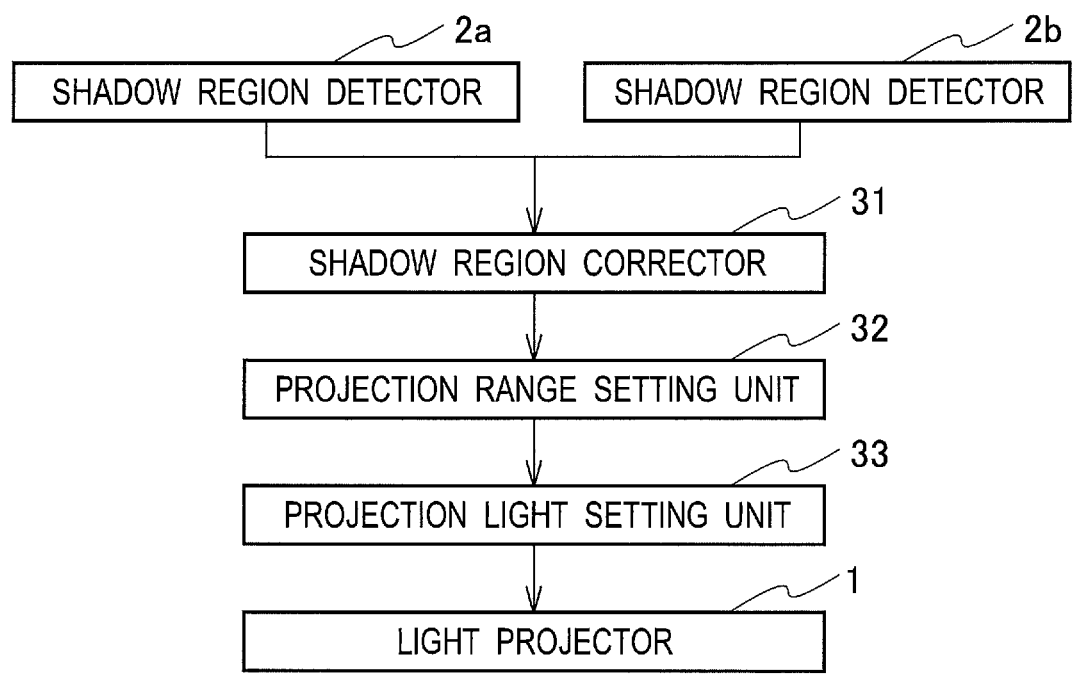
FIG. 11 is a block diagram showing the configuration of the light projection device shown as the fourth embodiment of the present invention.

As shown in FIG. 10 and FIG. 11, the light projection device as the fourth embodiment includes two or more shadow region detectors 2a and 2b. In such a way, the light projection device is configured so as to detect the shadow region 13 from two or more positions.

In this light projection device, the shadow region corrector 31 calculates correction regions of the shadow region 13, which correspond to the respective shadow region detectors 2a and 2b, and the projection range setting unit 32 sets the projection range. In this light projection device, the projection range setting unit 32 integrates the respective correction regions of the shadow region 13, and sets the projection range of the light projector 1. Note that, in this embodiment, the light projectors are two light projectors 1a and 1b; however, the number of light projectors may be more than two.

This light projection device sets, at two or more, the positions at which the shadow region 13 is detected, and the shadow region corrector 31 calculates the correction ranges of the shadow region 13, which correspond to the respective shadow region detection positions. Moreover, the projection range setting unit 32 integrates the correction regions of the shadow region 13, and sets the projection range of the light projector 1.

In accordance with the light projection device as described above, the shadow region 13 is detected from two or more positions, and accordingly, a detection range of the shadow region 13 can be expanded. Moreover, in accordance with this light projection device, the shadow region 13 of the irradiation target object 11 on the floor surface 12a and the back surface 12b can be detected from many directions, and accordingly, blind spots of the shadow region 13 when viewed from the shadow region detectors 2a and 2b can be suppressed, and it becomes possible to enhance detection accuracy for the shadow region 13. This results from the following. Specifically, depending on positional relationships between the irradiation target object 11 and the shadow region detectors 2a and 2b, portions (blind spots) where the shadow region detectors 2a and 2b cannot observe the floor surface 12a and the back surface 12b in the vicinity of the irradiation target object 11 are undesirably present. For this, in accordance with this embodiment, the shadow region 13 can be detected from two or more positions, whereby the shadow region 13 on the floor surface 12a and the back surface 12b can be measured from many orientations, and the blind spots can be eliminated.

Note that, naturally, this embodiment may be combined with the light projection device that projects the projection light L1 from two or more positions as mentioned above.

Fifth Embodiment

Next, a description is made of a light projection device according to a fifth embodiment. Note that the same reference numerals are assigned to similar portions to those of the above-mentioned embodiments, whereby a detailed description thereof is omitted.

Figure 12:
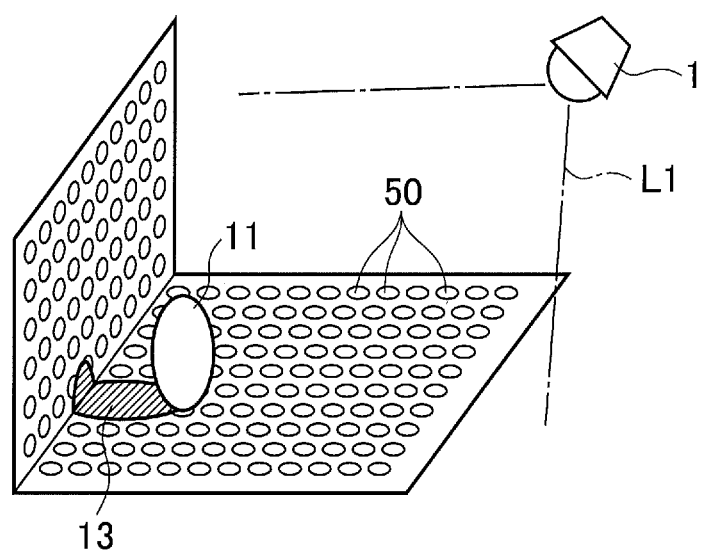
FIG. 12 is a perspective view showing a configuration of a light projection device shown as a fifth embodiment of the present invention.

In the light projection device as the fifth embodiment, as shown in FIG. 12, light sensors 50 embedded in the floor surface 12a and the back surface 12b in the vicinity of the irradiation target object 11 are used as the shadow region detector 2. That is to say, in the above-mentioned embodiments, the shadow region detector 2 is described to be the camera or the like; however, instead of this, a large number of the light sensors 50 are provided.

Each of the light sensors 50 supplies a light intensity signal, which is detected by itself, to the shadow region corrector. Based on the light intensity signal and positional information of each of the light sensors 50, the shadow region corrector 31 specifies the shadow region 13 on the floor surface 12a and the back surface 12b. At this time, the shadow region corrector 31 may detect brightness changes of the floor surface 12a and the back surface 12b, which are changes of such light intensity signals, or may detect color changes thereof. In such a way, the shadow region corrector 31 can follow and detect the shadow region 13 even if the irradiation target object 11 is deformed or moved.

The shadow region corrector 31 corrects the shadow region 13 so that the projection region of the light projector 1 and the shadow region 13 can coincide with each other on the floor surface 12a and the back surface 12b. Here, the shadow region corrector 31 may prepare in advance a correspondence map between the respective light sensors 50 and the projection range of the light projector 1, and may determine the projection light L1 from the light projector 1, which corresponds to the shadow region 13, with reference to the correspondence map. The projection range setting unit 32 sets the shadow region 13, which is corrected by the shadow region corrector 31, as the projection range of the light projector 1.

As described above, in accordance with this light projection device, the shadow region 13 is specified not by the image data but by detection results of the light sensors 50, and accordingly, the detection accuracy for the shadow region 13 can be enhanced. As a result, the light projection device can set the projection range of the light projector 1, in which accuracy is high, for the irradiation target object 11. Moreover, in accordance with this light projection device, the shadow region 13 can be detected without any blind spot even if the plurality of cameras are not used as the shadow region detector 2.

Note that the above-mentioned embodiments are merely examples. Therefore, naturally, the present invention is not limited to the above-mentioned embodiments, and is modifiable in various ways in response to design and the like within the scope without departing from the technical idea according to the present invention as long as such modifications are out of the embodiments.

INDUSTRIAL APPLICABILITY

The light projection device is usable for the purpose of projecting the projection light onto the irradiation target object arranged in an arbitrary space.

REFERENCE SIGNS LIST

1 LIGHT PROJECTOR, VISIBLE LIGHT PROJECTOR
2 SHADOW REGION DETECTOR
3 CONTROLLER
11 IRRADIATION TARGET OBJECT
12a FLOOR SURFACE
12b BACK SURFACE
13 SHADOW REGION
31 SHADOW REGION CORRECTOR
32 PROJECTION RANGE SETTING UNIT
33 PROJECTION LIGHT SETTING UNIT
41 BLACK LIGHT PROJECTOR
42 BLACK LIGHT REFLECTOR
50 LIGHT SENSOR

The invention claimed is:

1. A light projection device that projects light onto an object arranged in an arbitrary space, comprising:
   a light projector that projects projection light, in which the object and a back surface of the object are taken as a projectable range;
   a shadow region detector that detects a shadow region occurring on the back surface of the object by the projection light projected from the light projector;
   a shadow region corrector that corrects the shadow region so that a projection region of the light projector and the shadow region detected by the shadow region detector can coincide with each other on the back surface of the object, the shadow region being detected by the shadow region detector;

a projection range setting unit that sets, as a light projection range, the shadow region corrected by the shadow region corrector, and sets, as a non-light projection range, a region other than the shadow region, in a case of irradiating the projection light only onto the target object; and a projection light setting unit that sets projection light projected onto the light projection range set by the projection range setting unit, wherein the light projector projects light onto a range where the object is present by projecting the projection light onto the light projection range set by the projection range setting unit, the projection light being set by the projection light setting unit.

2. The light projection device according to claim 1, wherein the projection light setting unit specifies an element including any of illuminance, brightness, luminous intensity, luminous flux, color temperature and color rendering properties of the projection light projected by the light projector.

3. The light projection device according to claim 1, wherein the projection range setting unit sets the shadow region corrected by the shadow region corrector as a first projection range, and sets the region other than the shadow region as a second projection range, in a case of irradiating different pieces of projection light onto the object and the back surface of the object respectively, the projection light setting unit individually sets light projected onto the first projection range and the second projection range, and the projectable region of the light projector is divided into the first projection range where the object is present and the second projection range where the object is not present, and the light projector projects different pieces of light onto the first projection range and the second projection range.

4. The light projection device according to claim 1, wherein a shadow detection operation by the shadow region detector, a shadow region correction operation by the shadow region corrector, and a projection range setting operation by the projection range setting unit are performed at an arbitrary time interval.

5. The light projection device according to claim 1, wherein the shadow region detector includes a black light projector that projects black light onto a region including the projectable range of the light projector, and detects a shadow region formed of the black light projected by the black light projector.

6. The light projection device according to claim 1, wherein the light projector is configured to project the projection light from two or more positions, and the projection range setting unit sets the projection range for each of light projection positions.

7. The light projection device according to claim 1, wherein the shadow region detector is configured to detect the shadow regions from two or more positions, the shadow region corrector calculates the shadow region corrected for each of shadow region detection positions, and the projection range setting unit integrates the respective shadow regions corrected by the shadow region corrector, and sets the projection range of the light projector.

8. The light projection device according to claim 1, wherein the shadow region detector is composed of a light sensor embedded in the back surface of the object.

9. The light projection device according to claim 1, wherein it is possible to adjust timing of generation of illumination data for projecting the projection light as illumination light by the light projector, the generation being performed by an illumination data generator that generates the illumination data, and irradiation timing of the illumination light by the light projector.

10. The light projection device according to claim 1, wherein the light projector projects a video, and the projection light setting unit sets a video as the light projected from the light projector.

\* \* \* \* \*